Figure 3:
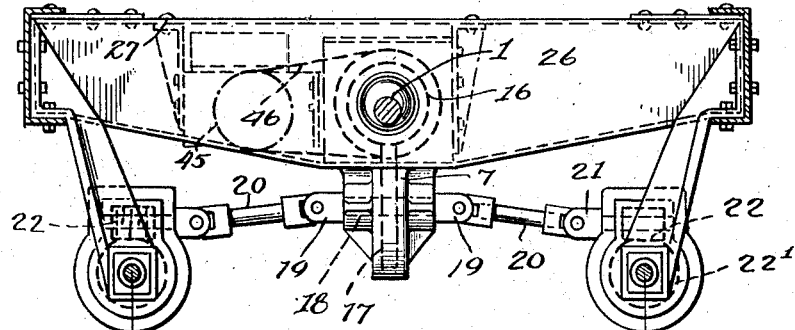

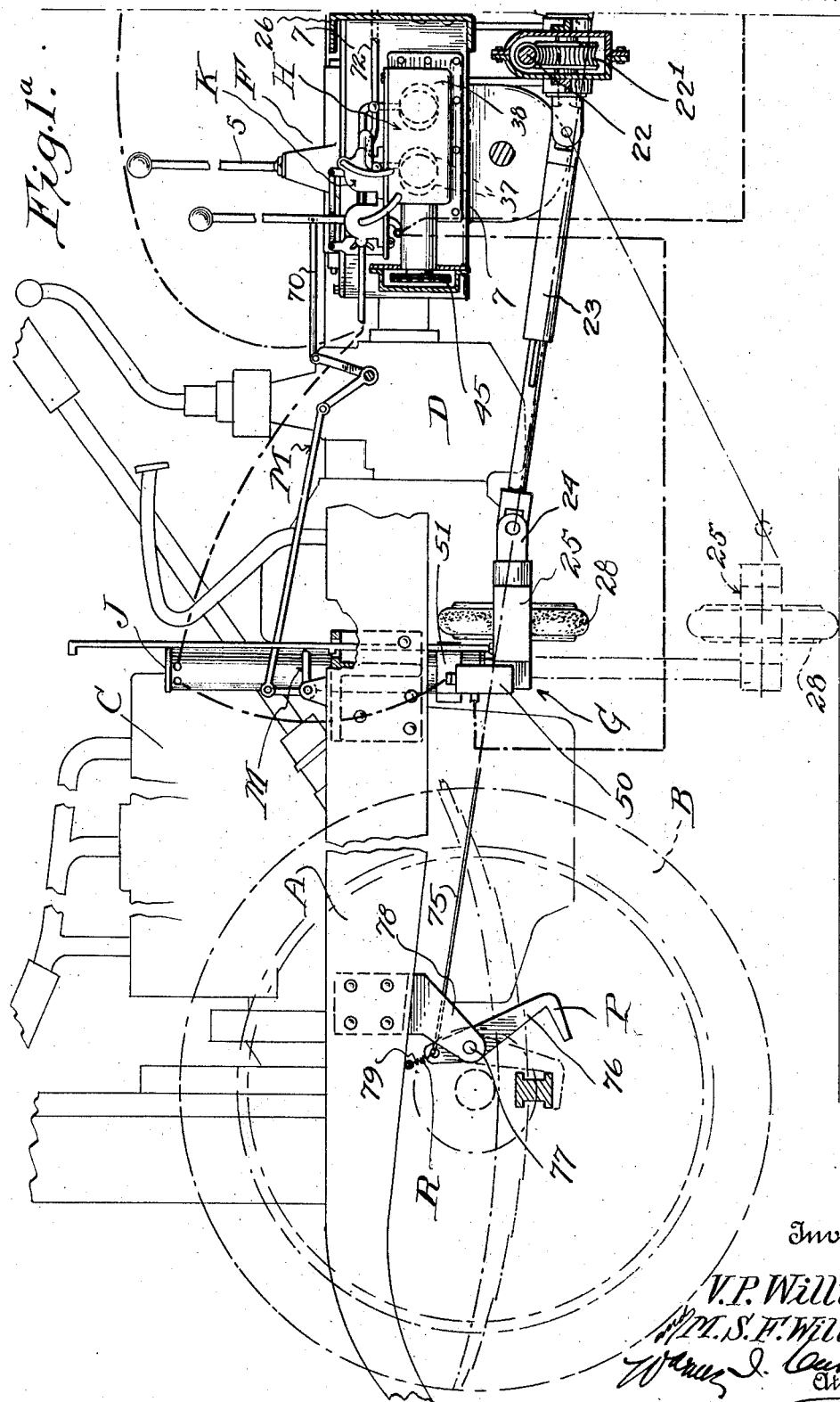

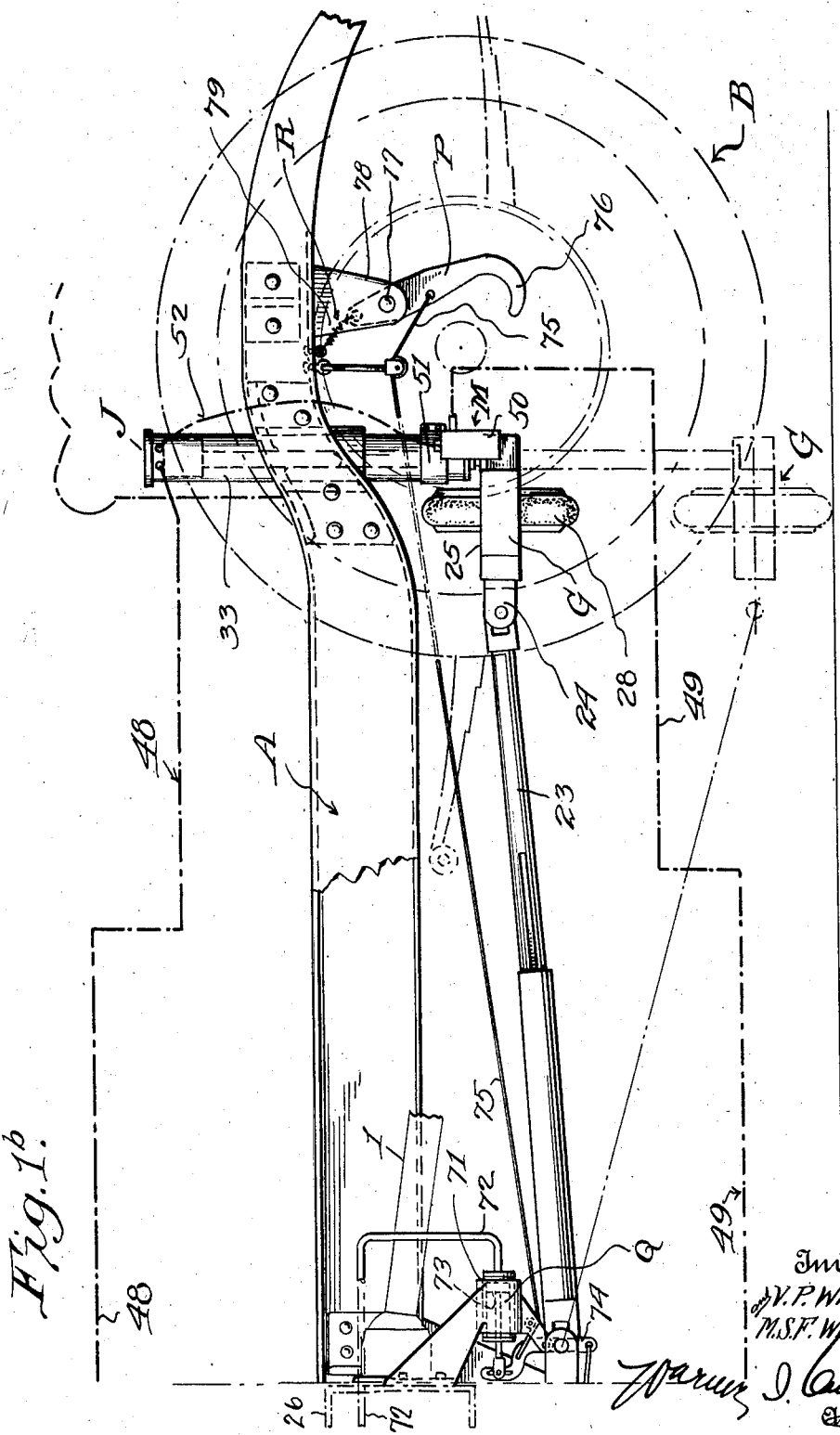

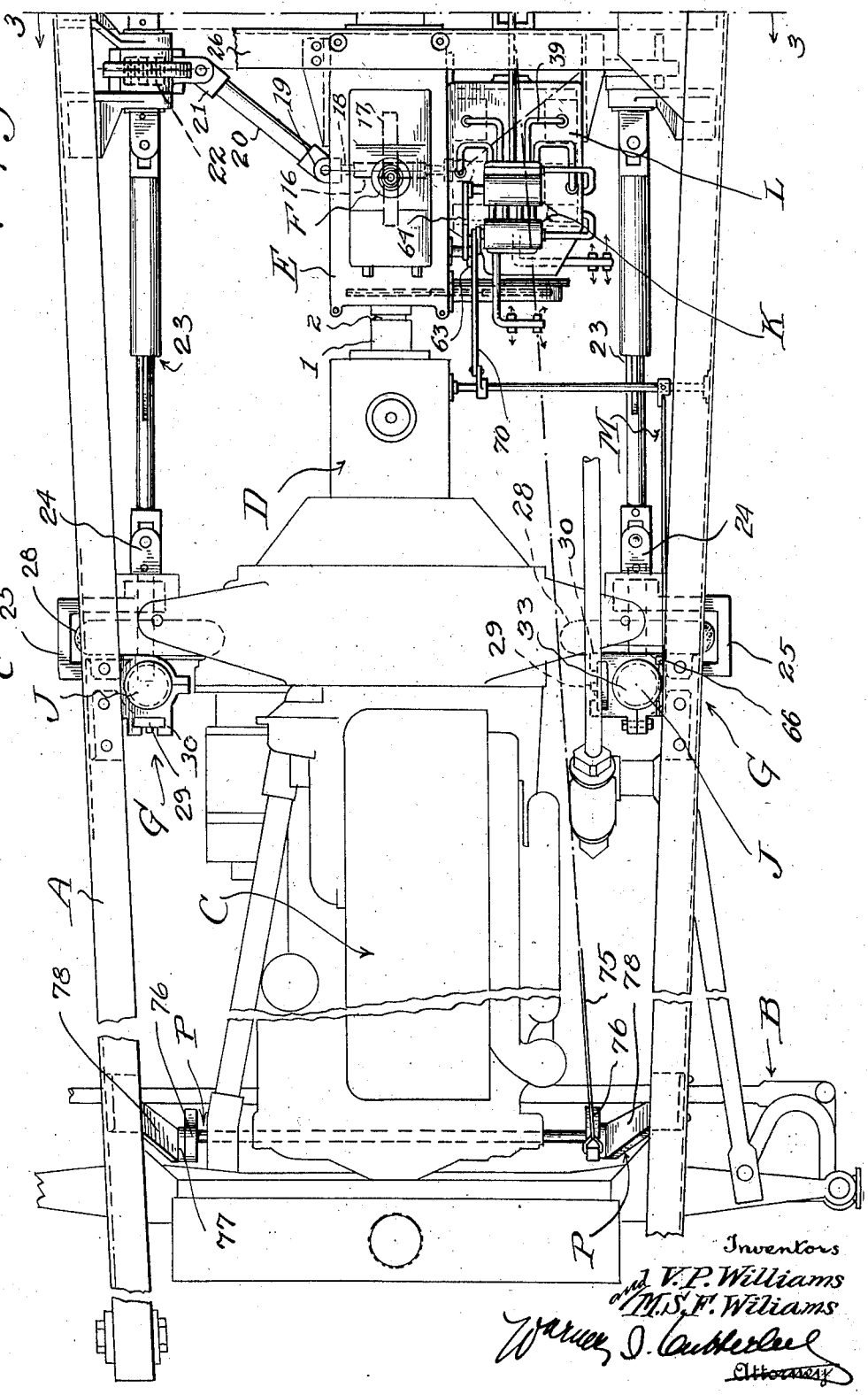

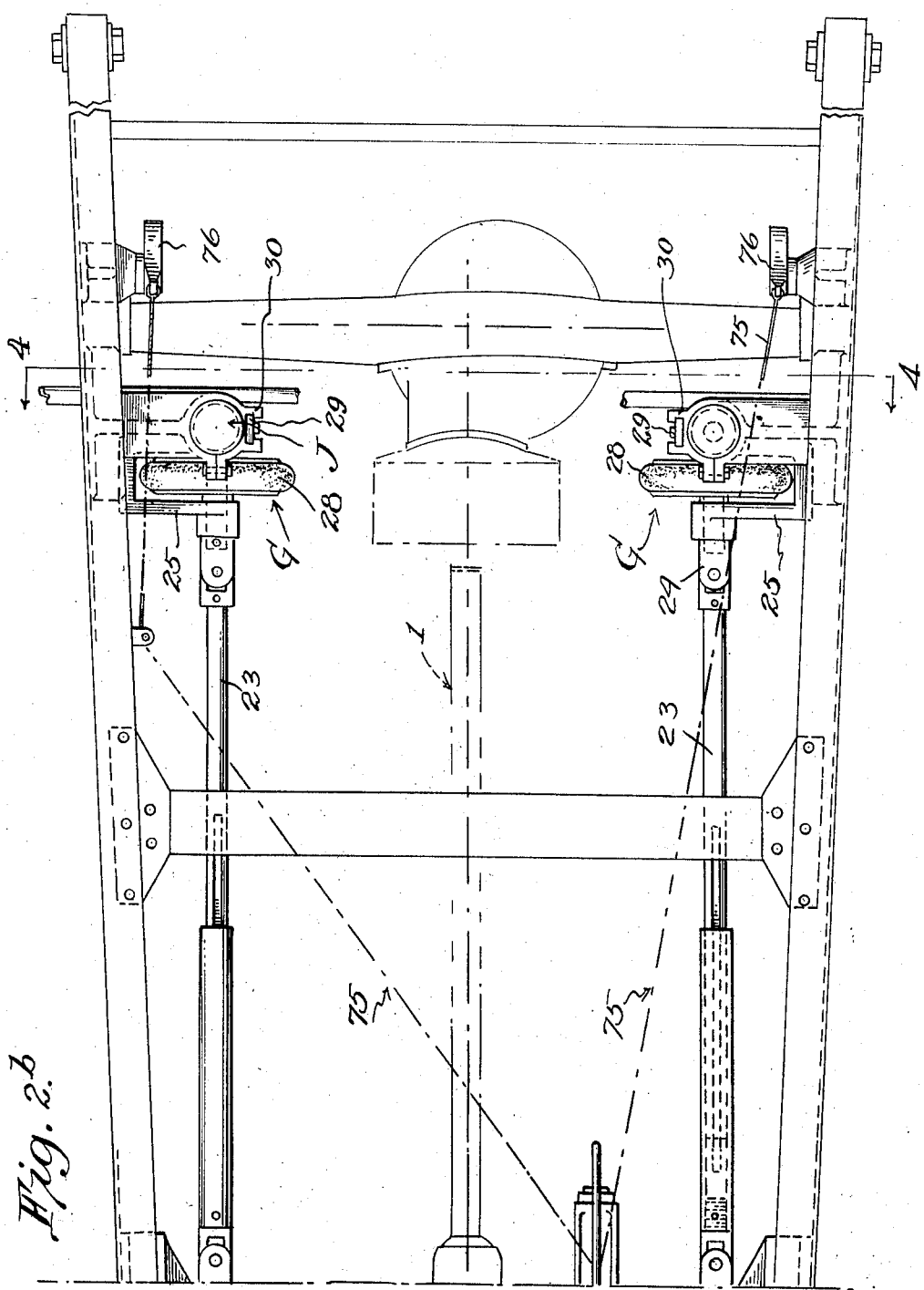

Dec. 8, 1925.
V. P. WILLIAMS ET AL
1,565,134
SUPPLEMENTARY TRACTION DEVICE FOR MOTOR VEHICLES
Filed Oct. 8, 1924
10 Sheets-Sheet 5

Inventors
V. P. Williams
M. S. F. Williams
Warren I. Cubberley
Attorney

Dec. 8, 1925.
V. P. WILLIAMS ET AL
1,565,134
SUPPLEMENTARY TRACTION DEVICE FOR MOTOR VEHICLES
Filed Oct. 8, 1924
10 Sheets-Sheet 6
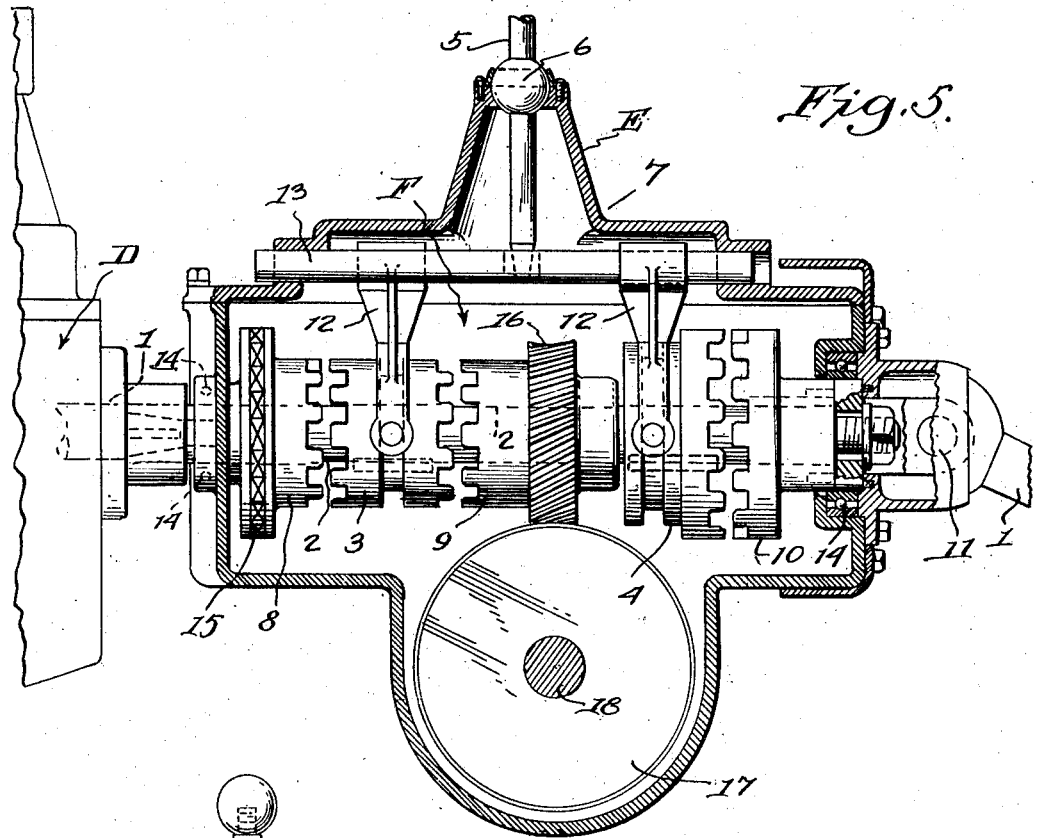
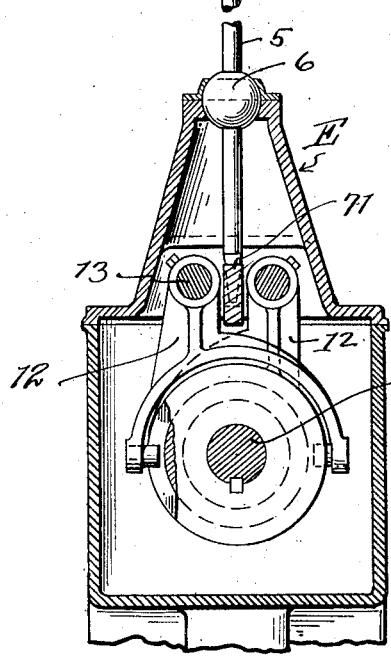
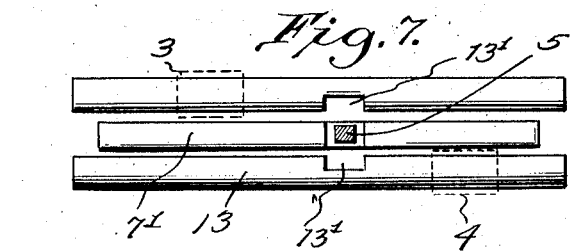
Inventors
V. P. Williams
M. S. F. Williams

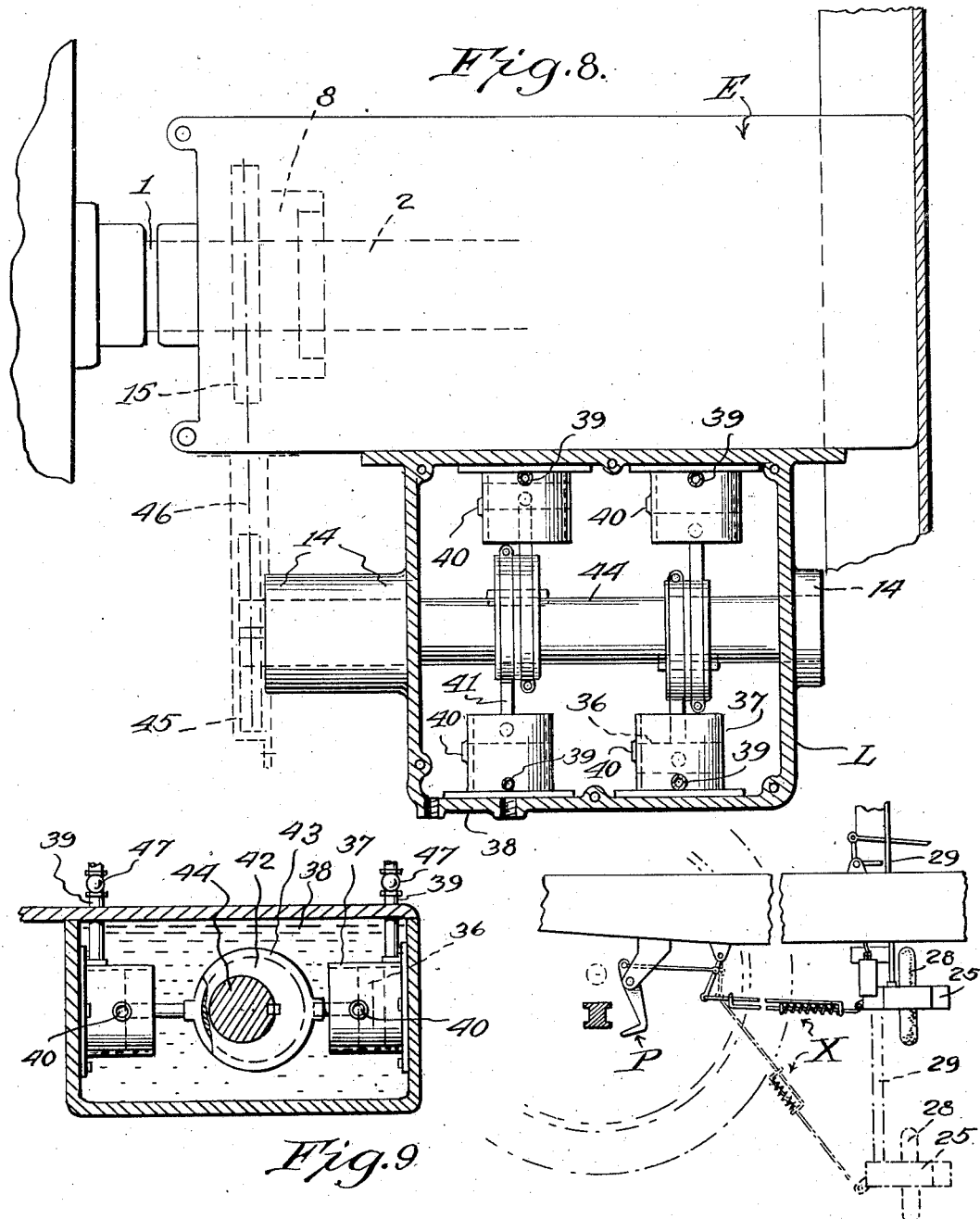

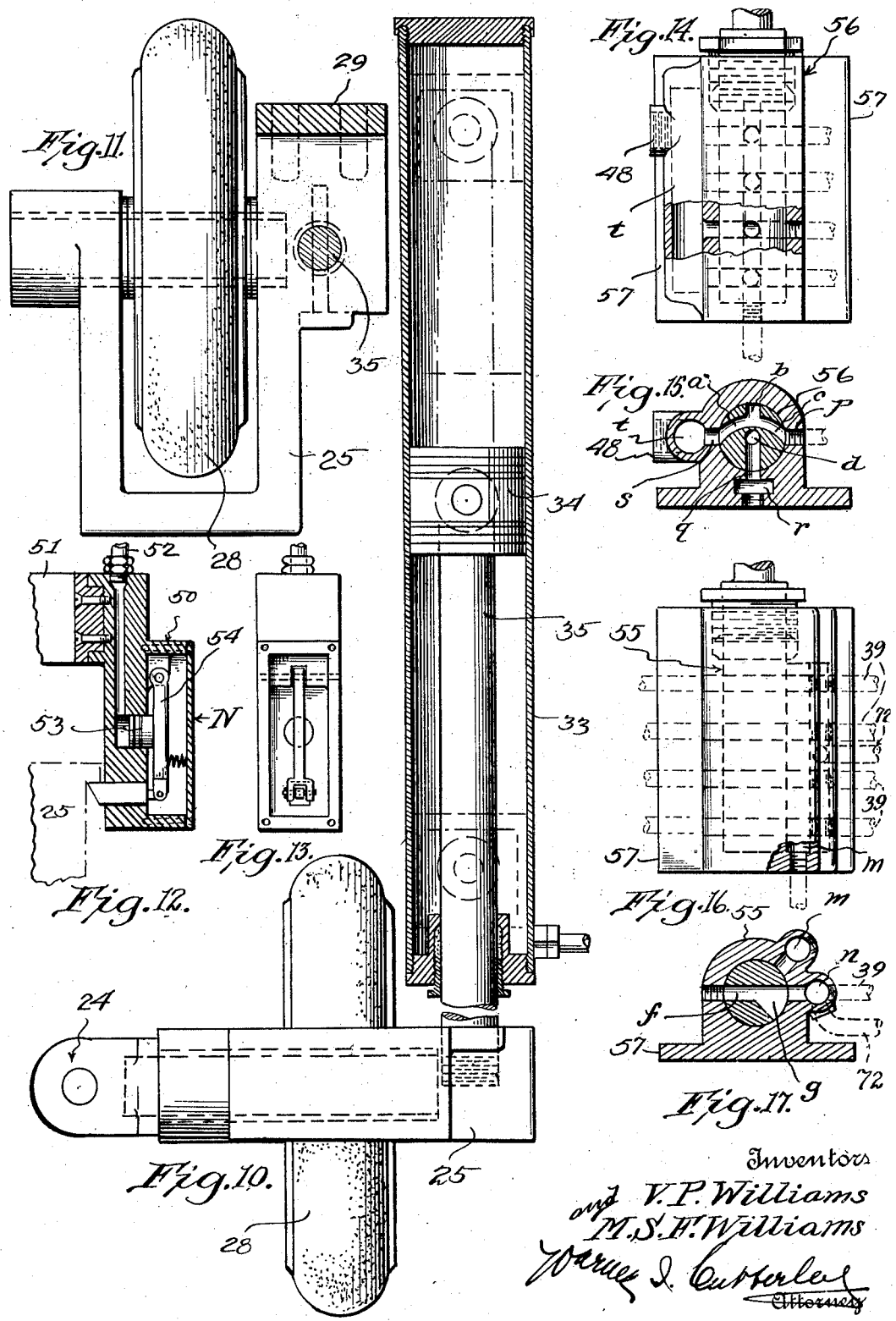

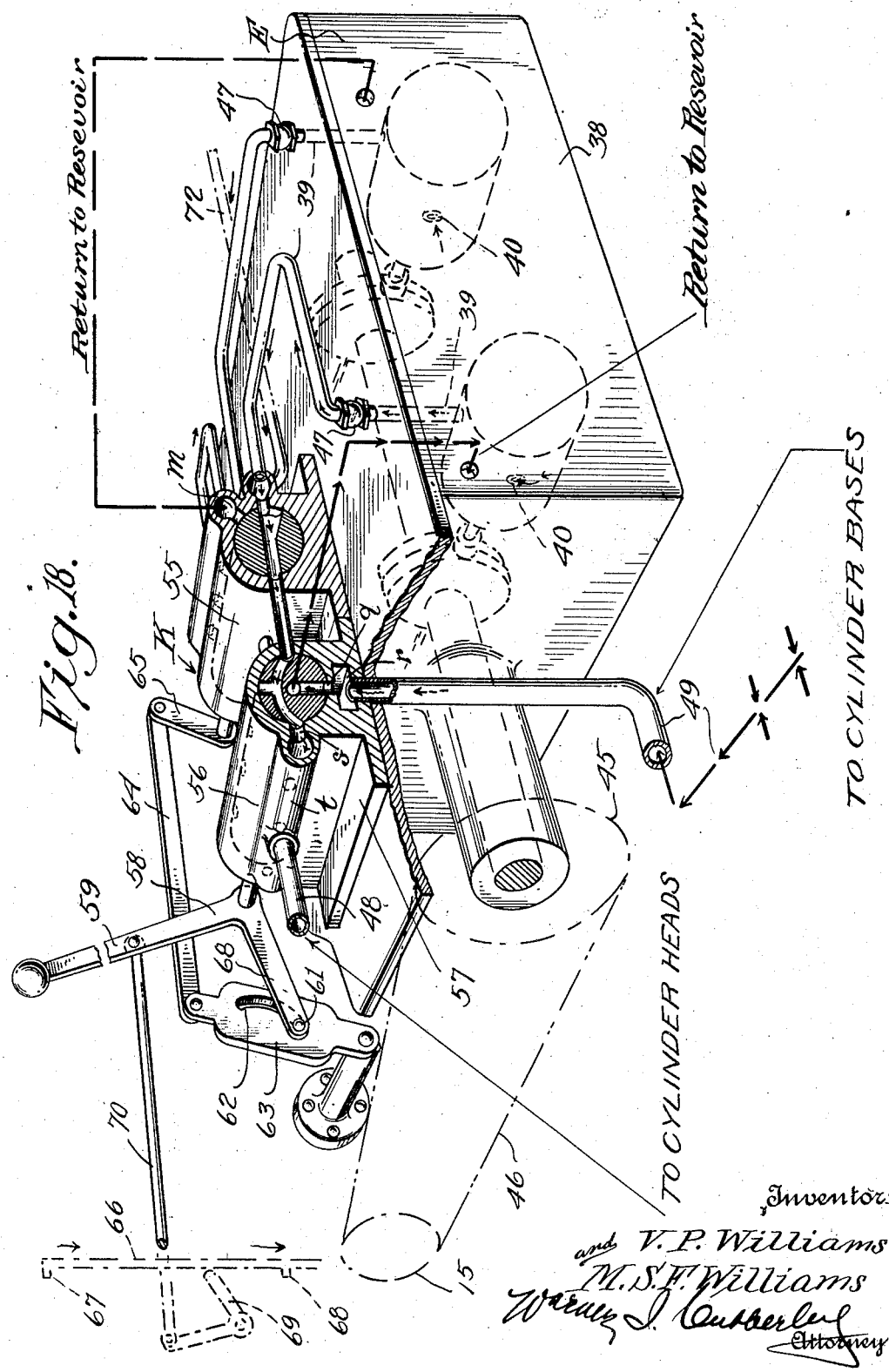

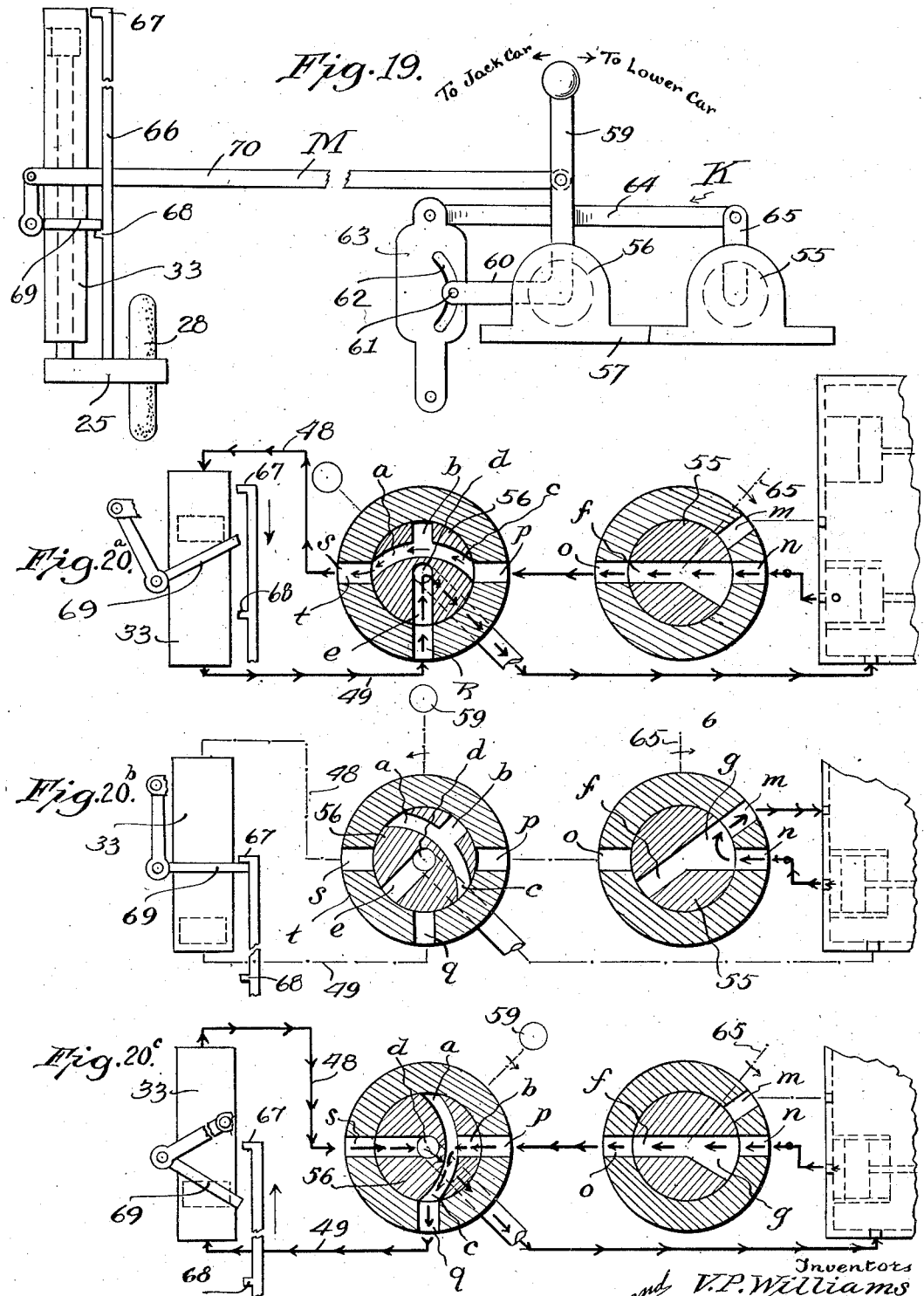

Patented Dec. 8, 1925.

1,565,134

UNITED STATES PATENT OFFICE.

VILLOR P. WILLIAMS AND MIRIAM S. F. WILLIAMS, OF BALTIMORE, MARYLAND; SAID VILLOR P. WILLIAMS ASSIGNOR TO SAID MIRIAM S. F. WILLIAMS.

SUPPLEMENTARY TRACTION DEVICE FOR MOTOR VEHICLES.

Application filed October 8, 1924. Serial No. 742,409.

*To all whom it may concern:*

Be it known that we, VILLOR P. WILLIAMS, a subject of the King of Rumania, and MIRIAM S. F. WILLIAMS, a subject of the King of England, residing at Baltimore, in the county of Baltimore and State of Maryland, have invented new and useful Improvements in Supplementary Traction Devices for Motor Vehicles, of which the following is a specification.

Our invention has reference, in its broad aspect, to improvements in devices for moving a mobile body in a lateral direction with respect to its normal path of travel and at right angles to its longitudinal axis; and more particularly it is our purpose to provide a device of this character which may be applied to any of the standard types of motor vehicles, such for instance as automobiles, trucks, tractors, and the like, and which when so applied will be coupled with the power plant of such vehicle by novel clutch devices designed to render our lateral propulsion mechanism effective only when the direct drive is rendered passive. Another and equally important distinguishing characteristic of our invention resides in the provision of unique fluid pressure means for bodily raising the vehicle on an even horizontal axis preparatory to moving the same in a lateral direction, and in order to both raise and lower the vehicle by the positive application of such pressure we have incorporated in our fluid pressure raising or jacking means suitable control devices, the manipulation of which accomplishes in a simple and effective manner the ends desired to be attained.

Various expedients have heretofore been proposed for the purpose of facilitating the handling of motor vehicles under the trying conditions of modern traffic and the great majority of these are grouped in the following general classification: first, those wherein all of the wheels are capable of being driven and steered; second, those wherein either the front or rear of the vehicle is raised and then propelled in a circular path with the remaining end of the vehicle as an axis; third, those having means for increasing the usual turning radius by modification of the steering gear; and, fourth, those contemplating bodily raising the vehicle and then moving it in a lateral direction. The first three types above defined contemplate the existence of sufficient space wherein to swing the body of the vehicle in a circular or curved path, and the usual absence of such space in crowded city thoroughfares constitutes the greatest objection to their practical application for use in facilitating the parking of a vehicle. The fourth and last class meets in its definition the requirements for ideal parking for it is simply necessary to stop the vehicle opposite the parking space, raise it bodily, and then move it laterally into such space. Any space sufficiently large to accommodate the overall length of the vehicle is adequate for the purpose of parking such vehicle when equipped with this type of device. However, we have found that previous devices in this last class are too complicated, fragile and inefficient, as well as too extravagant in the consumption of power to serve a practical purpose, and it is in the provision of a device of this last class having none of the disadvantages of its predecessors in the art and many additional advantages that they are incapable of attaining that we claim is embodied in the concept of our present invention.

Briefly defined, some of the principal advantages attributable to our invention are the following: first, the provision of novel means for automatically locking the raising or jacking elements of our invention in a retracted position and releasing the same therefrom when it is desired to bodily elevate and laterally move the vehicle; second, the provision of automatic means for engaging and supporting the conventional front and rear wheel assemblies of a vehicle to prevent distortion or sagging of the springs and the like when the vehicle is in a raised position; third, the practical incorporation in our invention of automatic tripping means for positively cutting off the fluid pressure supply to the jacking elements when the desired limit of either elevation or lowering of the vehicle is attained; fourth, the provision of simple and effective unitary means for regulating the delivery of fluid pressure whereby to accomplish by the positive application of such pressure both the raising and lowering of the vehicle; fifth, the adaptation to our jacking elements of unique guiding and supporting devices whereby to prevent possible distortion or disalignment of the respective parts thereof; sixth, the provision of novel unitary clutch controlled supplementary transmission means for interpolation in the conventional power line of a vehicle whereby our invention can be actuated only when the direct drive is rendered passive; and, seventh, the provision of means for coordinating the action of the above and other elements of our invention and rendering their action cooperative, whereby to attain the maximum mechanical efficiency and reduce the total number of parts of our invention to a minimum.

While the forgoing distinguishing features and objects of our invention may be considered as the most apparent from the standpoint of general construction and arrangement of parts, other and equally important objects and advantages exist by virtue of the novel detailed construction of the separate elements thereof, and these will be brought out and emphasized in the following detailed description.

To these and other ends, our invention consists in the construction, combination and arrangement of parts described hereinafter and pointed out in the claims.

One embodiment of our invention is represented by way of example in the accompanying drawings, wherein—

Figure 4:
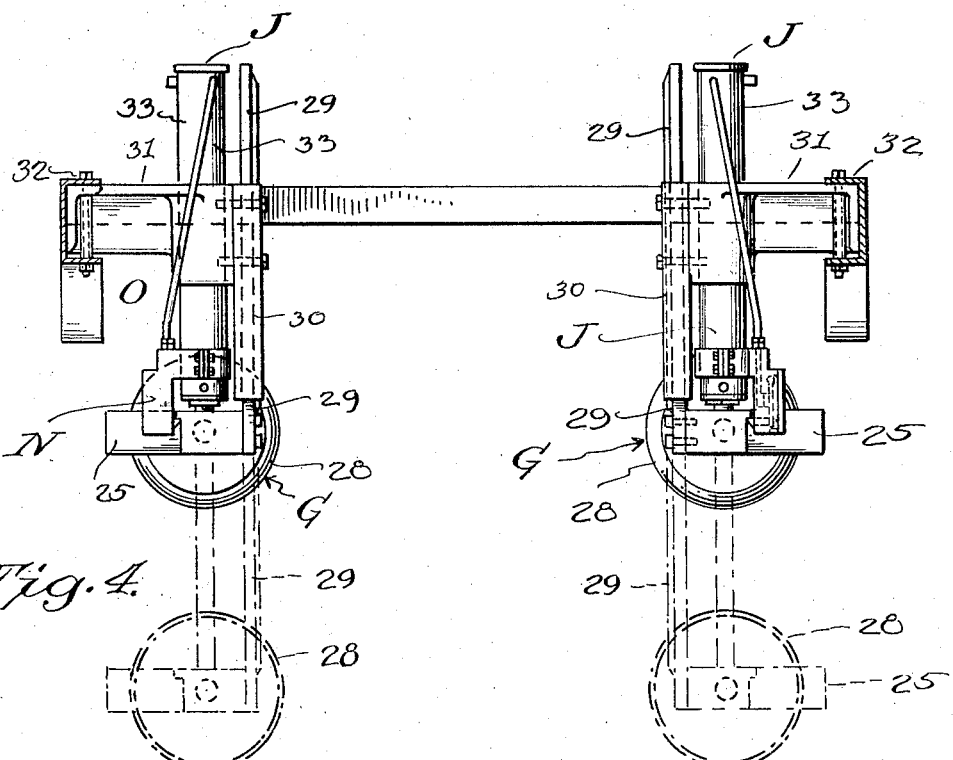

Figures 1$^a$ and 1$^b$ are side elevations of the assembly showing the manner in which our device is applied to a conventional motor car, front and rear respectively, Figures 2$^a$ and 2$^b$ are plan views of the assembly showing the manner in which our device is applied to a conventional motor car, front and rear respectively, Figure 3 is a detail view taken on the line 3—3 of Figure 2$^a$, Figure 4 is a detail view taken on line 4—4 of Figure 2$^b$, Figure 5 is a vertical, longitudinal section through the supplementary transmission, Figure 6 is a transverse sectional view of the supplementary transmission, Figure 7 is a detail of the arrangement of the shift rods, Figure 8 is a detail view of our pump battery, Figure 9 is a transverse section of the pump battery, Figure 10 is a detail of a portion of traversing wheel assemblies, Figure 11 is a plan view of the traversing wheel assembly with the cylinder and piston removed, Figure 12 is a detail view of our automatic traversing wheel locking device, Figure 13 is an elevation of the traversing wheel lock with the cover removed, Figure 14 is a plan view partly in section of the reverse valves, Figure 15 is a transverse section of the port system of the reverse valve, Figure 16 is a plan view partly in section of the relief valve, Figure 17 is a transverse section of the port system of the relief valve, Figure 18 is a perspective view of the valve, valve operating mechanism, and pump battery assembly, Figure 19 is a conventional view of the valve control means.

Figure 20$^a$ is a diagrammatic view of the valves in position for raising my vehicle, Figure 20$^b$ is a diagrammatic view of the valves in position for relief, or neutral, Figure 20$^c$ is a diagrammatic view of the valves in position for lowering the vehicle, and Figure 21 is detail view of a modified form showing the mechanical arrangement of my hook operating devices.

In the drawings wherein like characters of reference designate like or similar parts—

For the purpose of coordinating the portions of the following detailed description relating to the various specific elements of our invention, thereby to facilitate a proper understanding not only of its separate parts, but of the interpendency of those parts and their advantages as well as the advantages of the assembly, we refer particularly to Figures 1$^a$ and 1$^b$ of the drawings wherein the general lay-out of our invention is disclosed, and wherein the chassis of a conventional motor vehicle is designated A, the front and rear wheel assemblies including the springs therefor B, and the power plant C, also the usual transmission D. Interposed in the vehicle power line between the usual transmission D and the rear wheel assembly B, is a supplementary transmission E and clutch control devices therefor F. The supplementary transmission E includes a drive element preferably a spiral gear for the respective traversing or lateral propulsion wheel assemblies G of our invention, and another drive device preferably of the silent chain type to a pump battery H. The clutch F is so constructed that it is impossible to couple the vehicle power plant with our supplementary transmission while such power plant is coupled with the direct drive of the vehicle, and by the same token the pump battery H is passive while the direct drive is active. Each traversing wheel assembly G of which there are four—two for the front and two for the rear of the vehicle—includes a cylinder and piston unit J the purposes of which are to raise and lower the respective traversing wheels, and each of these units is arranged in a system of fluid circulation of which the pump battery H is a part, and of which the valve unit K is also a part. The pump battery casing L constitutes the fluid reservoir of the system, and by trip and link control devices M, one from each unit J to the valve mechanism K, the effective action of the pump battery may be confined to inducing fluid circulation (or closed circuit) in the reservoir when the desired limit of movement either upward or downward of the traversing wheels is accomplished. Furthermore, each traversing wheel is provided with a locking device N for positively retaining it in a retracted position, and such locking devices are each simultaneously and automatically rendered disengageable by increase of pressure thereon through a by-pass arrangement O with the cylinders of units J. When the vehicle is supported wholly on the traversing wheels it has been found that considerable sagging of the springs takes place and to the end that such sagging and other distortion may be prevented and the conventional vehicle running gear properly supported we have provided hook or latch devices P which are movable to an effective position through supplementary link and piston units Q adapted to be actuated by fluid pressure from the pump battery H when the valve mechanism K is in a neutral position; retraction of the hooks P is effected by springs R. It will thus be seen from the foregoing that we have attained an absolutely positive, practical, and effective device for both raising and laterally moving a vehicle thereby permitting the parking of such vehicle in a space no larger than its over-all length.

In order to interpolate our transmission and clutch mechanism D and F respectively in the conventional vehicle power line, we couple to the main shaft (1) of the power line a supplementary shaft section (2) to which are keyed for independent sliding movement only the clutch elements (3) and (4). A control lever (5), which is universally mounted as at (6) in a bearing formed in the supplementary transmission casing (7) is arranged to move the respective clutch elements (3) and (4) into and out of engagement with a pump clutch element (8) and a lateral drive clutch element (9), and with the vehicle power shaft clutch element (10) to which the power or main shaft is universally coupled as at (11). However in as much as the clutch elements (3) and (4) are yoked as at (12) to stub shafts (13) which are journalled on opposite sides of the notched guard rib (7') in the casing (7) and recessed as at (13'), the control lever (5) cannot be moved into notches (13') to throw in clutch elements (8) and (9) without first throwing out the clutch element (10), thereby preventing simultaneous delivery of power both to the lateral drive and the direct drive. Suitable anti-friction bearings (14) are provided throughout our invention where rotating parts are journalled in the casing, and all such bearings will hereinafter receive the same designation. The pump clutch element (8) carries a sprocket wheel (15), and the lateral drive or traverse drive clutch element (9) carries a spiral gear (16), these members constituting respectively the drive members for our pump battery H and supplementary transmission E.

The spiral gear (16) meshes with a driven spiral gear (17) which is keyed to a shaft (18) journalled in the casing (7), and to the respective ends of this shaft are universally coupled as at (19) one of the ends of each of the shafts 20, to the remaining ends of which are universally coupled stub shafts (21) carrying worm gears (22). The worm gears (22) mesh with worm gears (22'), to each of which are universally coupled one of the ends of each of the splined telescopic shafts (23), the respective remaining ends of which are in turn universally coupled to stub shafts (24). Stub shafts (24) are journalled in frames (25) and have keyed thereon the respective hubs of each of the traversing wheels (28) so that when the clutch element (3) is moved to couple the clutch element (7) with the power plant of the vehicle the respective traversing wheels (28) are actuated through the power transmission line above defined. Furthermore, the splined shafts (23) being telescopic, and universally mounted they will effectively transmit power to the wheels irrespective of the movement of the same in a vertical plane. In order to properly support the pump battery H, supplementary transmission E, and the aforementioned train of power transmission gearing so that undue strain will not be imposed upon the usual chassis construction of the vehicle we provide a hanger (26) to which these parts are bolted or rivited as at (27).

Each of the frames (25) has mounted thereon a guide (29) which moves in guide ways (30) formed in a cylinder hanger (31) which is secured to the chassis of the vehicle as at (32), one for each traversing wheel assembly. Cylinders (33) are preferably vertically mounted, one in each hanger, and are of the double compression chamber type, and each has arranged therein for reciprocation a drum piston (34). The shafts (35) of the pistons (34) pass through suitable packing glands in the heads of the cylinders and each engage one of the frames (25) of the traversing wheels (28) so that movement of the pistons in the cylinders is translated into corresponding movement of the said wheels.

Each cylinder (33) is arranged in a system of fluid circulation from pump battery H. The pump battery H comprises a plurality of pistons (36) preferably four in number adapted to work in cylinders (37) which are carried within a pump casing (38). The pump casing preferably constitutes the fluid reservoir. Each cylinder has an outlet pipe connection (39) adjacent its head, and an intake port (40) communicating with the fluid reservoir intermediate its extremities so that the action of the piston will intercept the port to regulate the intake of fluid. The shafts (41) of the pistons are connected with eccentrics (42) through the instrumentality of straps (43). The eccentrics (42) in turn are mounted on a shaft (44) journalled in the pump casing (38) and to which a sprocket wheel (45) is keyed and operatively connected by means of a silent chain (46) to sprocket wheel (15) of the clutch element (8) so that when the clutch element (3) is moved to couple the clutch element (15) with the power line of the vehicle the pump battery is actuated to withdraw fluid from the reservoir and force same, under pressure, into the circulation system through outlet pipe connections (39). The shaft (44) is mounted by means of antifrictional bearings hereinbefore identified by numeral (14), and suitable check valves (47) are interposed in the outlet pipes to prevent loss of pressure and return of fluid to the pump cylinders.

The outlet pipe connections (39) serve directly to our valve unit K, from whence the fluid under pressure is delivered at proper times (to be hereinafter described) by means of a double system of service pipes (or the pressure line) (48) and (49) respectively leading to the heads of the cylinders (33) and to their bases. We have found that the best results can be obtained by thus moving the pistons in a positive manner both up and down, and we attain this end by regulating the delivery of fluid so that pressure is increased in the bases of the cylinders, or below the respective piston heads when it is desired to raise the wheels (28), and in the heads of the cylinders, or above the pistons, when it is desired to lower them. The function of the service pipes (48) and (49) being reversed in each instance, i. e., the lower pipe serves as a return to the reservoir when the upper pipe functions as the pressure line or intake, and vice versa. Furthermore, in order to lock the traversing wheels (28) in a retracted position when the vehicle is functioning in the conventional manner, we have provided cages (50) which are secured to brackets (51) carried one by each cylinder (33) and to which a fluid by-pass (52) delivers from the head of each cylinder. A drum valve (53) in each cage controls a pivoted spring pressed catch device (54) for engaging the frame (25) of each of the wheels (28) when there is no pressure above the pistons (33), but as soon as pressure is increased to move the pistons down the drum valve (53) in each of the cages (50) is forced back against the spring to release the catch (54) so that the wheels may move downwardly to raise the vehicle preparatory to laterally moving the same.

The valve mechanism K by which we control the operation of the pump battery H and system of fluid circulation, comprises a pair of drum valves (55) and (56), hereinafter termed the "relief" valve and "reverse" valve respectively. These valves are rotatably mounted in a casing (57) which is carried on the pump battery casing (38). The "reverse" valve (56) has connected therewith a bell-crank control lever (58), one arm (59) of which serves as a handle, and the other arm (60) of which has mounted thereon a pin (61). The pin (61) slidably engages in an arcuate slot (62) provided in a link (63) which is connected by a reach rod (64) to a second link (65) which in turn is operatively connected with the "relief" valve (55). Manifestly a complete cycle of movement of the bell-crank lever (58) will bring the link (63) in its original position although during the cycle it will complete one swing. The link (65) will, of course, move in a direction corresponding to that of the link (63) and both will at all times be parallel. The reverse valve (56) is formed with a substantial T-passage having three ports $a$, $b$, and $c$, a bore $d$ and a fourth port $e$; the relief valve has a passage $f$ communicating with a throat $g$ which is adapted at times (as will be hereinafter described) to complete a connection with either or both of two ports $m$ and $n$ in its casing. Passage $f$ on the other hand is designed to register with ports $o$. The ports $o$ are in a system of circulation with ports $p$ in the casing of the reverse valve (56). The casing of the valve (56) on the other hand has ports $q$ communicating with a manifold $r$ from which pipes (49) lead to the bases of the cylinders (33), and ports $s$ communicating with a manifold $t$ from which the pipes (48) lead to the heads of the cylinders. The ports $n$ in the casing of the reverse valve (55) are connected with the outlet pipes (39) of the pump battery; while the ports $m$ are connected with the fluid reservoir as also does the bore $d$ of the relief valve (56).

The operation of my valve system is best described with reference to the diagrams. The first diagram shows the valves in position for jacking the vehicle, i. e., with the pipe line (48) serving as the pressure line to the heads of the cylinders (33). Here the fluid under pressure follows the direction of the arrows through ports $n$, passage $f$ and ports $o$ of the relief valve (55), and ports $p$, passages $c$ and $a$, and ports $s$ to manifold $r$ and the pipe line (48). Return of fluid from the bases of the cylinders is through pipe line (49) in the direction of the arrows.

The handle (59) in this cycle of operation has been thrown to the position shown by dot and dash lines and in the direction of the arrow. The next position of the valves is the neutral position with all of the valve ports blind-stopped except throat g of relief valve (55) which in this position serves both ports m and n thereby forming a closed circuit to the fluid reservoir; the continued operation of the pump battery serving only to induce circulation of fluid in the direction of the arrows. The final position of the valves is that assumed when lowering the vehicle and retracting the traversing wheels, and in this instance the relief valve (through the instrumentality of the slot (62) in link (63), is caused to assume the same position as in the case of raising the vehicle—the first diagram. However, the reverse valve has been moved to register ports b with ports p and passage c with ports q and manifold r thereby delivering fluid under pressure to pipe line (49) to the bases of the cylinders (33), with return of fluid from the heads thereof through pipe line (48). The system of fluid circulation being in the direction of the arrows.

In order to automatically control the operation of our valve mechanism to place the system in a neutral status at a predetermined point in the operation of elevating or lowering a vehicle, we provide on each traversing wheel frame (25) a standard (66) carrying upper and lower fingers (67) and (68) respectively which are adapted to contact at predetermined times with a detent (69) in the form of a bell-crank lever which is pivoted to cylinder hanger (31) and connected by a reach rod (70) to the handle (59), so that the handle (59) will be automatically moved to effectually regulate the operation of our valve mechanism.

In order to support the front and rear wheel assemblies B to prevent distortion and sagging of the springs and the like when the vehicle has been raised we provide a supplementary cylinder (71) which is directly connected by a pipe (72) to pressure line manifold of valve (55) so that sustained pressure will be present in the cylinder (71) so long as there is pressure in the fluid circulation system. Within the cylinder (71) is a piston (73) which is connected to a lever (74). The lever (74) in turn is operatively connected by cables (75) with hook devices (76)—hereinbefore generally designated by P—which are pivotally mounted as at (77) between the bifurcations of brackets (78) carried by the chassis. In lieu of hydraulic means, mechanical devices in the form of levers and extensible connections X may be utilized. Suitable springs (79)—hereinbefore generally designated by R—are provided to withdraw the hooks from the assemblies B when there is no pressure in the fluid circulation system as is the case when the vehicle is to be propelled in the usual manner.

While it is believed that the operation of our invention will be apparent from the foregoing it is desired to again and particularly emphasize the ease and facility with which our invention may be manipulated; when it is desired to park an automobile equipped with our device, it is brought to a stop opposite the parking space, and the lever (5) is moved to engage the clutch element (3) with the pump clutch (8). The clutch element (4) to the direct drive power line will at the same time be automatically uncoupled. The pump battery H being connected by the silent chain (46) to clutch element (8) will be actuated to affect circulation of fluid in the reservoir. The lever (59) is now moved to place the valves in the status shown in the first diagram thereof, whereupon the hooks (76) will engage themselves to support the wheel assemblies B and the pressure line (48) will be energized to move pistons (34) downwardly. The pistons (34) being connected to the traversing wheels (28), the same will be simultaneously moved downwardly to raise the vehicle from the road bed (a distance preferably of about three inches). The vehicle having been raised to the desired height the lever (59) will be automatically moved through the instrumentality of trip devices M to place the valves in a neutral position whereby to cut-off the pump battery. The lever (5) is now moved to couple clutch elements (3) and (9), thus actuating the traversing wheels through the shafts (23) to move the vehicle toward the curb and into the parking space. To move the vehicle out from the parking space the conventional automobile gear transmission is thrown in reverse, and the traversing wheels rotated in the opposite direction. To lower the vehicle to resume the normal manner and direction of travel the preceding operations are inversely repeated.

While in the foregoing there has been illustrated and described such combination and arrangement of elements as constitute the preferred embodiment of our invention, it is nevertheless desired to emphasize the fact that interpretation of the invention should only be conclusive when made in the light of the subjoined claims Having described our invention and its objects with such attention to detail as will thoroughly acquaint one skilled in the art with its construction and advantages, we claim:—

1. The combination with a prime mover and selective transmission means, of traction devices coupled with said transmission means for rotational movement, a closed system of fluid circulation including a pressure generating element coupled with said transmission means, means for controlling the generation of pressure in said system and means interposed in said system of fluid circulation and engaging said traction devices for moving the same in a vertical path upon increase or decrease of fluid pressure in the system.

2. The combination with a prime mover and selective transmission means of multiple traction devices coupled with said transmission means for simultaneous rotational movement, a closed system of fluid circulation including a pressure generating element coupled with said transmission means, automatic means for controlling the generation of pressure in said system, and plural means interposed in said system of fluid circulation and each engaging one of said traction devices for moving the same simultaneously in a vertical path upon increase or decrease of fluid pressure in the system.

3. Supplementary traction means for motor vehicles comprising selective transmission means coupled with the power line of the vehicle, traction devices coupled with said transmission means for rotational movement, a closed system of fluid circulation including a pressure generating element coupled with said transmission means, selective means for controlling the generation of pressure in said system, and means interposed in said closed system of fluid circulation and engaging said traction devices for moving the same in a vertical path upon increase or decrease of pressure in the system whereby to bodily raise the said vehicle.

4. Supplementary traction means for motor vehicles, comprising selective transmission means coupled with the power line of the vehicle, multiple traction devices coupled with said transmission means for rotational movement to bodily move the vehicle in a lateral direction, a closed system of fluid circulation including a pressure generating element coupled with said transmission means, selective valve means for controlling the generation of pressure in said system, and plural means interposed in said system of fluid circulation and one associated with each of said traction devices for moving the same in a vertical path upon increase or decrease of pressure in the system whereby to bodily raise said vehicle.

5. Supplementary traction means for motor vehicles comprising selective transmission means coupled with the power line of the vehicle, multiple traction devices coupled with said transmission means for rotational movement to bodily move the vehicle at right angles to its normal path of travel, a system of fluid circulation including a pressure generating element coupled with said transmission means, valve devices for regulating the pressure in the system, and plural means interposed in said system of fluid circulation and engaging said traction devices for moving the same in a vertical path upon increase or decrease of pressure in the system whereby to bodily raise said vehicle preparatory to moving the same in a direction at right angles to its normal path of travel.

6. The combination in supplementary traction devices for motor vehicles, of means for coupling said traction devices for direct drive from the power plant of a vehicle, a system of fluid circulation including a pressure generating element, means for coupling said pressure generating element with the power plant of a vehicle, means interposed in said fluid circulation system and engaging said traction devices for moving the same in a vertical direction, and automatic means for cutting off the pressure in said system when the traction devices have reached a predetermined point in their path of vertical movement.

7. The combination in supplementary traction devices for motor vehicles, of means for coupling said traction devices for direct drive from the power plant of a vehicle, a system of fluid circulation including a pressure generating element, means for coupling said pressure generating element with the power plant of a vehicle, means interposed in said fluid circulation system and engaging said traction devices for moving the same in a vertical direction and selective clutch devices for preventing the simultaneous coupling of the direct drive of a vehicle with the drive for the traction devices or of the pressure generating element.

8. The combination in supplementary traction devices for laterally and bodily moving a motor vehicle, of fluid pressure operated means associated with said traction devices for bodily raising the vehicle preparatory to moving the same, and automatic locking devices associated with said aforementioned raising means for supporting the conventional traction assemblies of a vehicle in their normal position.

9. The combination in supplementary traction devices for laterally and bodily moving a motor vehicle, of fluid pressure operated means associated with said traction devices for bodily raising the vehicle preparatory to moving the same, and fluid pressure controlled locking devices operatively associated with the fluid pressure operated means whereby to hold the traction devices in a passive position when the vehicle is persuing its conventional manner of travel.

10. The combination in combined raising and lateral propulsion mechanism for motor vehicles, of multiple vertically movable traction devices arranged in a closed system of fluid power transmission coupled with the power plant of the vehicle, and valve control devices whereby said traction devices will be automatically uncoupled when the power plant of the vehicle is coupled with the direct drive therefor.

11. The combination in supplmentary traction devices for laterally and bodily moving a vehicle, of fluid pressure operated means associated with said traction means for vertically moving the same to bodily raise a vehicle preparatory to moving the same, said means including an automatically controllable valve assembly for cutting off the delivery of pressure to said vehicle raising means whereby to limit the degree of vertical movement of the same for the purpose defined.

In testimony whereof we affix our signatures hereunto.

VILLOR P. WILLIAMS.
MIRIAM S. F. WILLIAMS.